E. DICKEY.
PORTABLE POWER UNIT.
APPLICATION FILED MAR. 26, 1917.
1,383,391. Patented July 5, 1921.
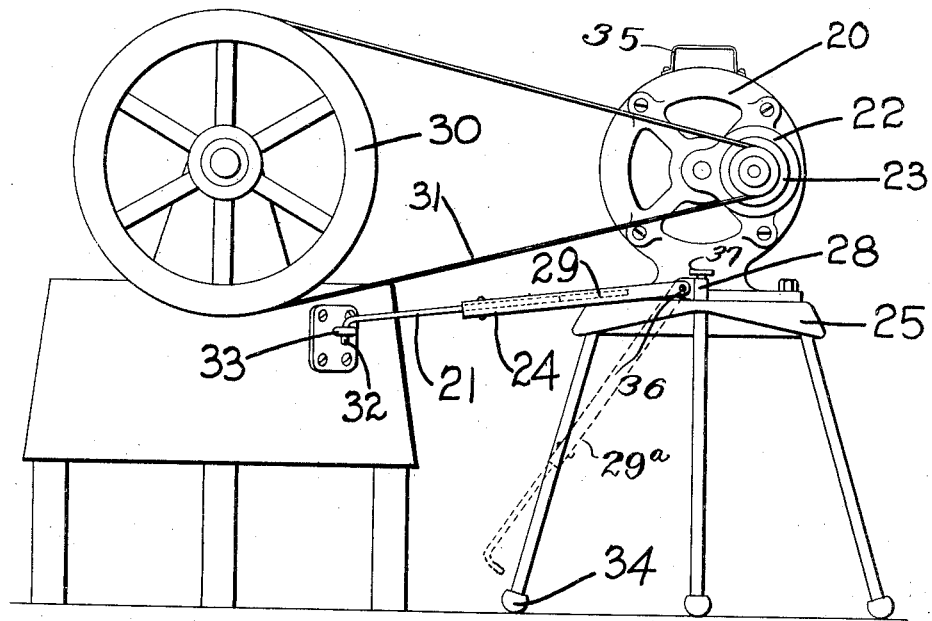
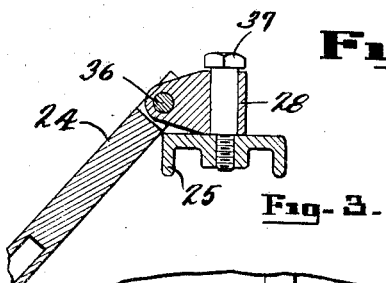
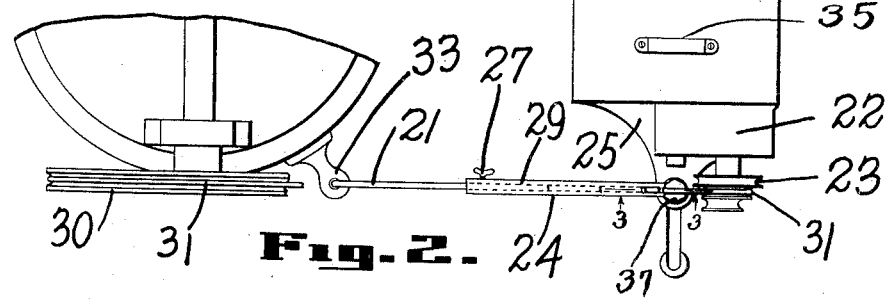

UNITED STATES PATENT OFFICE.

ERNEST DICKEY, OF DAYTON, OHIO, ASSIGNOR, BY MESNE ASSIGNMENTS, TO DELCO-LIGHT COMPANY, OF DAYTON, OHIO, A CORPORATION OF DELAWARE.

PORTABLE POWER UNIT.

1,383,391.   Specification of Letters Patent.   Patented July 5, 1921.

Application filed March 26, 1917. Serial No. 157,564.

*To all whom it may concern:*

Be it known that I, ERNEST DICKEY, a citizen of the United States of America, residing at Dayton, county of Montgomery, and State of Ohio, have invented certain new and useful Improvements in Portable Power Units, of which the following is a full, clear, and exact description.

This invention relates to improvements in portable power units, and more particularly to that type of power unit which is provided with a motor and hereinafter referred to as a power stand, adapted to be connected to and drive a work machine by means of a belt or flexible connection.

A large number of such work machines, particularly those used for domestic and farm purposes, as for instance separators, churns, washing machines, grindstones, and the like, have in the past been operated by hand with a normal speed at the operating handle of from 35 to 75 revolutions per minute, depending on the type of work machine used. It is therefore an object of the present invention to provide a power stand particularly adapted as regards the amount of power to drive such work machines, and at the same time being so constructed as regard weight, shape and arrangements of the parts as to be readily carried about from place to place and quickly put into operation with the various work machines as desired.

Another object of the present invention is to provide a portable power stand with a simple and efficient bracing and spacing device which is adapted to hold the power stand and work machine in relative positions and to keep the belt connection between these two devices taut.

Another object of the present invention is to so position the spacing device relative to the points of power application on both the driving and driven machine, that said machines will be held in substantially fixed positions, thereby tending to prevent the machines from being shifted and consequently affect the belt connection therebetween.

Further objects and advantages will be apparent from the following description, reference being had to the accompanying drawing wherein a preferred embodiment of one form of the present invention is clearly set forth.

In the drawing:

Figure 1 is a view in side elevation, disclosing the driving motor of the power stand connected to the work machine by means of a belt, and the spacing device interposed between the power stand and the work machine.

Fig. 2 is a plan view of the device shown in Fig. 1, parts being shown broken away for the sake of clearness.

Fig. 3 is an enlarged detail section taken on the line 3—3 of Fig. 2, looking in the direction of the arrows, the spacing device being shown in its limiting position.

Referring to the drawing, the numeral 20 designates an electric motor which is secured to and carried by the base 25 of the power stand in any suitable manner.

The base is provided with three spreading supports or legs the feet of which engage frictionally with the floor or any suitable surface, and thus serve to support the motor in a suitable position elevated from the floor whereby it is removed from the dust, dirt or mud often found around work machines of the kind referred to. The arrangement described has other marked advantages among which may be mentioned the fact that the motor and the spacing device 29, to be hereinafter described, are placed within convenient reach for adjustment, repair or inspection, and that the motor may be brought closer to the pulley of the work machine than would be the case were the motor placed directly on the floor thus enabling a reduction in the length of the driving belt and in the trouble and expense of its upkeep.

A further advantage of the arrangement above described is that a handle or hand hold 35 may be secured to the motor in such position and at such a height that an adult person of average height and strength may lift the power stand with one hand without stooping over and carry it about from place to place as desired, the power stand remaining always in an upright position whereby it may be quickly and easily set down again ready to be operated. The arrangement whereby the power stand may be lifted with one hand without stooping over, carried about without touching the ground or spilling oil from the bearings and then set down again in an upright position is an important factor in the portability of the power stand in view of the fact that the weight of an electric motor of sufficient power to drive work machines of the kind referred to is very close to the limit of weight which can be conveniently carried about by one person even by using both hands.

As already pointed out, hand-operated working machines of the kind referred to are equipped with operating handles arranged for rotation at various normal speeds ranging from 35 to 75 revolutions per minute. In order to drive such a machine, using a pulley of practical dimensions in place of the operating handle, the driving pulley 23 must be operated at a low speed, by which I mean at such a speed that if the pulley 23 were mounted directly upon the armature shaft, the motor would be considered to be a low speed motor by those skilled in the electric motor art. While it is entirely possible to construct such a motor, it has been found in practice that it is too large and too heavy to meet the requirements of the present invention. By employing a motor of a higher speed and reducing the speed of pulley 23 through a train of speed reducing gears, contained in the housing 22 as shown, it has been found possible to bring the weight of the power stand within the limits of portability established for the present invention, and at the same time to develop the required power and speed at the driving pulley 23.

The driving pulley 23 is herein shown as consisting of a series of stepped pulleys which are directly connected to the train of reducing gears and which are adapted to be connected to the pulley 30 on the work-machine to drive the same at various speeds.

When a flexible connection is used between two machines of which either one or both are portable, it has been found by experiment that the torque of the flexible connection or rather, of the driving pulley, will tend to shift the relative positions of the machines and thereby affect the operation of same. This is particularly true in a power stand having a high-torque driving pulley, as herein described, wherein the weight of the power stand is limited by certain considerations to a value which is insufficient to prevent it from shifting or, under certain conditions of operation, to prevent it from tilting or perhaps even falling over.

In order to prevent any movement of the power stand relative to the work machine, and to brace the power stand in its adjusted position, the power stand is provided with a spacing and bracing device 29, including two members 21 and 24, which are adapted to slidably fit one within the other, respectively. A screw 27 is secured to the member 24, which is adapted to hold these two members 21 and 24 in any relative longitudinal position.

The member 24 of the spacing device 29 is pivotally secured by a horizontal pin 36 to the sleeve 28 which in turn is rotatably mounted on a vertical stud 37 carried by the base 25. The member 21 is provided with a hooked extremity 32, which is adapted to fit into the eye member 33 carried by the work-machine.

By referring to the Fig. 2, it can be seen that the eye member 33 and the sleeve 28 are so positioned on the work machine and the power stand respectively, that when the spacing device 29 is placed in position, it will be in direct alinement with the flexible or belt connection 31 between the driving pulley and the pulley on the work-machine.

This arrangement makes the torque of the belt connection 31 a direct longitudinal pull against the spacing device, and tends to overcome any shifting of the machine and thereby prevents the slacking of the belt or the moving of the pulleys out of alinement.

While it is apparent from the above that it is desirable to have the spacing and bracing device as nearly as possible in alinement with the belt connection, it is found in practice that the position of the eye member 33 will vary widely in different machines, being governed largely by the space available for its attachment, and as a consequence, the spacing and bracing device must frequently take a position other than that shown. Movement of the spacing member in any direction is provided for by the sleeve 28 which has pivotal connection about a vertical axis with the base 25, and about a horizontal axis with the member 24 of the spacing device. The sleeve 28 thus affords a universal connection between the power stand and the spacing device, permitting the attachment of the spacing device at its hooked end to any convenient object which may be other than a work machine.

Referring particularly to Figs. 2 and 3, it will be observed that that portion of the base 25 adjacent the stud 37 extends laterally to form a shoulder or limiting stop concentric with the stud throughout one-half its circumference. The purpose of this shoulder is to limit the downward swing of the spacing device 29 about the pin 36 so that when the power stand is disconnected from the work machine the spacing device will not drop down between the supporting legs where it may interfere with the carrying as well as the subsequent placing of the power stand. This is particularly annoying when the spacing device becomes entangled with the central supporting leg (see Fig. 1) in such a manner that the power stand cannot be conveniently lifted high enough to clear the ground or when the spacing device is continually becoming caught on the floor and the person carrying the power stand is thereby placed in danger of being tripped. The arrangement to overcome this objection will be better understood by reference to Fig. 1 in which the normal operating position of the spacing device is shown in full lines. When the power stand is carried about the spacing device will drop to the limiting position 29ª, shown in dotted lines, the angle of which is such that the end of the spacing device cannot drop down between the supporting legs where it is liable to sustain injury or be clogged up with dirt when the power stand is set down, or where it may even cause the power stand to be upset. It will be observed, further, from Fig. 1 that the proportion of the parts is such that when the spacing device is in its non-extended position it cannot touch the ground even outside the supporting area included between the feet of the supporting legs and that should it be left extended sufficiently to touch the ground it has a tendency to swing around to the rear where it is less objectionable.

In order to facilitate the rigid holding of the portable power stand in position, the foot of each support or leg is provided with a cap or cover 34. These caps or covers 34 may be made of any suitable material that will readily adhere to floors—rubber however being preferable.

In the foregoing, the present invention has been described as particularly adapted for driving separate work machines previously operated by hand, but it should be clearly understood that this is illustrative and is not to be considered as a limitation in any respect, inasmuch as the invention is equally adapted for driving other work machines whether formerly driven by hand or not.

While the form of mechanism herein shown and described, constitutes a preferred embodiment of one form of the invention it is to be understood that other forms might be adopted and various changes and alterations made in the shape, size and proportion of the elements therein, without departing from the spirit and scope of the invention.

What I claim is as follows:

1. In combination with a power device, of a spacing and belt tightening device comprising spacing members, one of said members adapted to be attached to a work machine while the other is pivotally mounted on the power device permitting the spacing device to extend in a plurality of directions from said power device; and means for securing said spacing members together.

2. The combination with a power device, of a spacing and belt tightening device comprising spacing members, one of said members having provisions for a hook and eye connection with a work machine while the other has provisions for a universal connection with the power device permitting the spacing device to extend in a plurality of directions from said power device; and means for securing said spacing members together.

3. The combination with a portable power device adapted to drive a separate work machine, of a spacing and belt tightening device comprising slidably engageable members, means for securing said members together in adjusted position, said spacing and belt tightening device having provisions for a universal connection with the power device whereby it may be extended in a plurality of directions to hold the power device in adjusted position.

4. In combination with a portable power device, of extensible spacing means pivotally mounted on the power device and capable of extending in a plurality of directions to brace the power device.

5. In combination with a portable device comprising a supporting means; a spacing means pivotally attached to the portable device; and means for holding the spacing means out from the supporting means of the portable device.

6. In combination with a portable power device comprising a supporting member having feet; a spacing device pivotally attached to the power device; and means for preventing the spacing device from entering the supporting area included between the feet of the supporting member.

7. In combination with a portable device comprising means for supporting it from the floor; an extensible spacing means pivotally attached to the portable device; and means for holding the spacing means when in non-extended position out of contact with the floor.

8. In combination with a portable device comprising means for supporting it from the floor; an extensible spacing means pivotally attached to the portable device; and means for holding the spacing means when in non-extended position out from the supporting means and out of contact with the floor.

9. In combination with a portable device comprising supporting means; a sleeve member attached to the portable device and adapted to rotate about a vertical axis; a spacing means pivoted to the sleeve member and adapted to rotate about a horizontal axis; and means for limiting the downward movement of the spacing means about the horizontal axis.

10. A portable utility power stand for general use in driving separate work machines, comprising in combination, a base; supporting legs secured thereto and adapted to support the base in stable equilibrium in an elevated position from the floor; an electric motor mounted on the base, said motor comprising speed-reducing gearing and a driving pulley adapted to be connected by a belt with the pulley of a separate work machine; and bracing means secured to the power stand adapted to hold the power stand spaced from the work machine when in adjusted position.

11. A portable utility power stand for general use in driving separate work machines, comprising in combination, a base; supporting legs secured thereto and adapted to support the base in stable equilibrium in an elevated position from the floor; an electric motor mounted on the base, said motor comprising speed-reducing gearing and a driving pulley adapted to be connected by a belt with the pulley of a separate work machine; and bracing means secured to the power stand adjacent said pulley and adapted to be extended laterally from the power stand to hold it spaced from the work machine when in adjusted position.

12. A portable utility power stand for general use in driving separate work machines, comprising in combination, a base; supporting legs secured thereto and adapted to support the base in stable equilibrium in an elevated position from the floor; an electric motor mounted on the base, said motor comprising speed-reducing gearing and a driving pulley adapted to be connected by a belt with the pulley of a separate work machine; and adjustable bracing means secured to the power stand adjacent said pulley and adapted to be extended laterally from the power stand to hold the belt taut and to hold the power stand spaced from the work machine when in adjusted position.

13. A portable utility power stand for general use in driving separate work machines, comprising in combination, an electric motor having a driving pulley at one end thereof driven by the motor; supporting means secured to the motor and adapted to rest frictionally on the floor to support the motor in stable equilibrium in an elevated position from the floor; and bracing means secured to the power stand on the same side as the driving pulley and adapted to be extended laterally from the power stand to hold it spaced from the work machine when in adjusted position.

14. A portable utility power stand for general use in driving separate work machines, comprising in combination, an electric motor having a driving pulley at one end thereof driven by the motor; supporting means secured to the motor and adapted to rest frictionally on the floor to support the motor in stable equilibrium in an elevated position from the floor; and bracing means pivotally secured to the power stand on the same side as the driving pulley and adapted to be extended laterally from the power stand to hold it spaced from the work machine when in adjusted position.

15. A portable utility power stand for general use in driving separate work machines, comprising in combination, an electric motor having a driving pulley at one end thereof driven by the motor; supporting means secured to the motor and adapted to rest frictionally on the floor to support the motor in stable equilibrium in an elevated position from the floor; and bracing means having a universal connection with the power stand adjacent to the driving pulley and adapted to be extended laterally from the power stand to hold it spaced from the work machine when in adjusted position.

16. A one-man portable and carryable utility power stand for general use in driving separate work machines having its center of weight above the middle thereof and comprising in combination, an electric motor having a driving pulley adapted to exert a high torque; supporting means secured to the motor adapted to rest frictionally upon the floor and to normally support the motor in stable equilibrium in an elevated position; and means for bracing the power stand with respect to the work machine to hold it in adjusted position against the action of the high-torque driving pulley.

17. A one-man portable utility power stand for general use in driving separate work machines, comprising in combination, an electric motor having a driving pulley driven from the motor through speed reducing gearing; means secured to the motor and resting frictionally upon the floor to normally support the motor in stable equilibrium in an elevated position; and a hand hold secured to the power stand in such position that the power stand may be carried in an upright position by a person of normal height with the use of one hand only.

In testimony whereof I affix my signature in the presence of two subscribing witnesses.

ERNEST DICKEY.

Witnesses:
WALTER W. RIEDEL,
NELSON R. HAAS.